United States Patent
Dearth et al.

(10) Patent No.: US 9,909,514 B2
(45) Date of Patent: Mar. 6, 2018

(54) DIRECT INJECTION OF DILUENTS OR SECONDARY FUELS IN GASEOUS FUEL ENGINES

(71) Applicant: Ford Global Technologies, LLC, Dearborn, MI (US)

(72) Inventors: Mark Allen Dearth, Dearborn, MI (US); David Karl Bidner, Livonia, MI (US); Gopichandra Surnilla, West Bloomfield, MI (US); Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 669 days.

(21) Appl. No.: 13/889,047

(22) Filed: May 7, 2013

(65) Prior Publication Data
US 2014/0331642 A1 Nov. 13, 2014

(51) Int. Cl.
*F02D 19/06* (2006.01)
*F02D 19/12* (2006.01)
*F02D 19/02* (2006.01)

(52) U.S. Cl.
CPC ....... *F02D 19/0647* (2013.01); *F02D 19/025* (2013.01); *F02D 19/0692* (2013.01); *F02D 19/12* (2013.01); *Y02T 10/32* (2013.01); *Y02T 10/36* (2013.01)

(58) Field of Classification Search
CPC .............. F02D 41/0025; F02D 19/081; F02D 19/0692; F02D 19/084; F02D 19/061; F02D 19/0665; F02D 41/3094; F02D 19/0694; F02D 19/0647; F02D 19/0642; F02D 19/12; Y02T 10/36; Y02T 10/123; Y02T 10/121; Y02T 10/144; Y02T 10/44; Y02T 10/125; F02B 2075/125; F02B 17/005;
(Continued)

(56) References Cited

U.S. PATENT DOCUMENTS

| 3,498,767 A | 3/1970 | Foster |
| 5,546,908 A | 8/1996 | Stokes |
| 5,718,194 A | 2/1998 | Binion |

(Continued)

FOREIGN PATENT DOCUMENTS

| CN | 102080598 A | 6/2011 |
| EP | 0073306 B1 | 4/1986 |

(Continued)

OTHER PUBLICATIONS

Pursifull, Ross Dykstra, "Gaseous Fuel System and Method for an Engine," U.S. Appl. No. 13/682,514, filed Nov. 20, 2012, 35 pages.
(Continued)

*Primary Examiner* — Mary A Davis
(74) *Attorney, Agent, or Firm* — Julia Voutyras; McCoy Russell LLP

(57) ABSTRACT

A method for a turbocharged engine, comprising: during high load conditions, in response to an elevated engine temperature, after port injecting a first quantity of a first gaseous fuel, direct injecting a second quantity of a second, liquid fuel at a first timing that is a function of a desired air-fuel ratio. In this way, engine power may be maximized while simultaneously decreasing the maximum combustion temperature and mitigating engine knock.

19 Claims, 9 Drawing Sheets

(58) Field of Classification Search
CPC .. F02M 69/046; F02M 37/0064; F02M 43/00; F02M 25/14; F02P 5/1527
USPC ..... 123/431, 304, 575, 299, 436, 497, 25 C; 60/600; 701/103, 110
See application file for complete search history.

(56) References Cited

U.S. PATENT DOCUMENTS

| | | | |
|---|---|---|---|
| 7,398,763 B2 | 7/2008 | Gibson et al. | |
| 7,444,987 B2 | 11/2008 | Cohn et al. | |
| 8,166,953 B2 | 5/2012 | Caley | |
| 8,327,687 B2 | 12/2012 | Amann et al. | |
| 2002/0007816 A1* | 1/2002 | Zur Loye | F02B 1/12 123/295 |
| 2005/0205063 A1* | 9/2005 | Kolmanovsky et al. | 123/436 |
| 2007/0084197 A1 | 4/2007 | Murase et al. | |
| 2007/0101968 A1 | 5/2007 | Gibson et al. | |
| 2009/0084349 A1* | 4/2009 | Cohn | F02B 47/04 123/304 |
| 2010/0121559 A1 | 5/2010 | Bromberg et al. | |
| 2010/0161203 A1* | 6/2010 | Shigenaga et al. | 701/110 |
| 2010/0206260 A1 | 8/2010 | Tobias et al. | |
| 2011/0088657 A1* | 4/2011 | Tanno | F02D 35/028 123/305 |
| 2011/0174268 A1* | 7/2011 | Surnilla | F02M 25/025 123/406.29 |
| 2012/0041665 A1* | 2/2012 | Pursifull et al. | 701/103 |
| 2012/0048242 A1* | 3/2012 | Surnilla et al. | 123/497 |
| 2012/0143480 A1 | 6/2012 | Pursifull | |
| 2012/0260886 A1* | 10/2012 | Mulye | F02B 47/02 123/25 C |
| 2013/0199499 A1 | 8/2013 | Pursifull | |

FOREIGN PATENT DOCUMENTS

| | | |
|---|---|---|
| EP | 1120561 A2 | 8/2001 |
| EP | 1213457 A2 | 6/2002 |
| EP | 1230327 B1 | 6/2006 |
| EP | 1213457 B1 | 11/2006 |
| EP | 1985833 A2 | 10/2008 |
| EP | 2048339 A1 | 4/2009 |
| JP | H05263698 A | 10/1993 |
| JP | 2002054522 A | 2/2002 |
| JP | 2004156552 A | 6/2004 |
| JP | 2005337100 A | 12/2005 |
| WO | 0236946 A1 | 5/2002 |
| WO | 2007092142 A2 | 8/2007 |
| WO | 2010089568 A1 | 8/2010 |

OTHER PUBLICATIONS

Bidner, David Karl et al., "Method and System for Engine Control," U.S. Appl. No. 13/743,237, filed Jan. 16, 2013, 32 pages.
Badillo, Ed et al., "Method and System for Engine Control," U.S. Appl. No. 13/754,667, filed Jan. 30, 2013, 39 pages.
Church, Jeremy Walter, "Feed Forward Dynamic Spool Valve," U.S. Appl. No. 13/762,018, filed Feb. 7, 2013, 33 pages.
Zhang, Xiaogang, "Strategy for Engine Cold Start Emission Reduction," U.S. Appl. No. 13/778,691, filed Feb. 27, 2013, 21 pages.
Rumpsa, Todd Anthony, "Method for Operating a Direct Fuel Injector," U.S. Appl. No. 13/852,824, filed Mar. 28, 2013, 26 pages.
Bidner, David Karl et al., "Method for Reducing Valve Recession in Gaseous Fuel Engines," U.S. Appl. No. 13/889,080, filed May 7, 2013, 36 pages.
Bidner, David Karl et al., "Direct Injection of Diluents or Secondary Fuels in Gaseous Fuel Engines," U.S. Appl. No. 13/889,069, filed May 7, 2013, 65 pages.
Bidner, David Karl et al., "Method for Reducing Valve Recession in Gaseous Fuel Engines," U.S. Appl. No. 13/889,094, filed May 7, 2013, 36 pages.
Bidner, David Karl et al., "Direct Injection of Diluents or Secondary Fuels in Gaseous Fuel Engines," U.S. Appl. No. 13/889,103, filed May 7, 2013, 65 pages.
Packman, Keith, "Lean-Burn Engine Technology Increases Efficiency, Reduces NOx Emissions," Technical Information from Cummins Power Generation, Power Topic #7009, 2007, 2 pages.
State Intellectual Property Office of the People's Republic of China, Office Action and Search Report Issued in Application No. 201410190967.0, Nov. 1, 2017, 10 pages. (Submitted with Partial Translation).

* cited by examiner

DIRECT INJECTION OF DILUENTS OR SECONDARY FUELS IN GASEOUS FUEL ENGINES

BACKGROUND AND SUMMARY

Alternate fuels have been developed to mitigate the rising prices of conventional fuels and for reducing exhaust emissions. For example, natural gas has been recognized as an attractive alternative fuel. For automotive applications, natural gas may be compressed and stored as a gas in cylinders at high pressure. Various engine systems may be used with CNG fuels, utilizing various engine technologies and injection technologies that are adapted to the specific physical and chemical properties of CNG fuels. For example, mono-fuel engine systems may be configured to operate only with CNG while multi-fuel systems may be configured to operate with CNG and one or more other fuels, such as gasoline or gasoline blend liquid fuels. Engine control systems may operate such multi-fuels systems in various operating modes based on engine operating conditions.

However, CNG engines, particularly engines that have been converted to run on CNG experience numerous operating problems. CNG has marginal ignitability and a narrow rich limit compared to gasoline and other traditional fuels. Thus, when running a CNG engine at high loads, the temperature limit of the engine may be reached prior to fully combusting the fuel or air taken into the combustion cylinder. By not fully combusting the contents of the combustion cylinder, the likelihood of engine knock increases. Further, the combustion of CNG produces far less soot than for an equivalent gasoline engine. This reduces the natural lubrication of engine valves, potentially leading to valve recession and degradation.

To counter overheating problems, the air charge may be limited by either throttling airflow or running lean, but these solutions will limit the maximum power output of the engine. Specific power may be increased by increasing the size of the engine, but this may not be possible for all platforms or conversions. Injecting water or other control fluids into the combustion chamber may reduce temperatures and guard against engine knock, but may further reduce the ignitability of the fuel mixture.

The inventors herein have realized that the above issues may be at least partly addressed for example, by a method for a turbocharged engine, comprising: during high load conditions, in response to an elevated engine temperature, after port injecting a first quantity of a first gaseous fuel, direct injecting a second quantity of a second, liquid fuel at a first timing that is a function of a desired air-fuel ratio. In this way, engine power for an engine primarily fueled by the first, gaseous fuel may be maximized while simultaneously controlling the maximum combustion temperature and maximum combustion pressure and mitigating engine knock.

In another example, a method for a turbocharged engine may comprise: during high load conditions, in response to an elevated engine temperature, after port injecting a first gaseous fuel, direct injecting a second, liquid fuel at a timing that is after combustion spark-ignition, but during combustion of, the first gaseous fuel. In this way, a second, liquid fuel injected between spark ignition and a top-dead center event may reduce combustion temperature and pressure, regardless of the ignitability of the second, liquid fuel. Further, a second, liquid fuel injected after spark ignition and following a top-dead center event may reduce exhaust temperatures regardless of the ignitability of the second, liquid fuel.

In yet another example, a method for a turbocharged engine, comprising: during high load conditions, in response to engine knock, after port injecting a first gaseous fuel, direct injecting a second, liquid fuel while maintaining spark timing. In this way, engine knock in an engine primarily fueled by a gaseous fuel may be mitigated by injecting a second, liquid fuel coincident with combustion events, and without iteratively advancing and retarding spark timing in response to engine knock.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTIONS OF THE DRAWINGS

FIG. 1 schematically depicts an example embodiment of a cylinder of an internal combustion engine.

FIG. 2 schematically depicts an example embodiment of a multi-cylinder engine.

Figure 9:
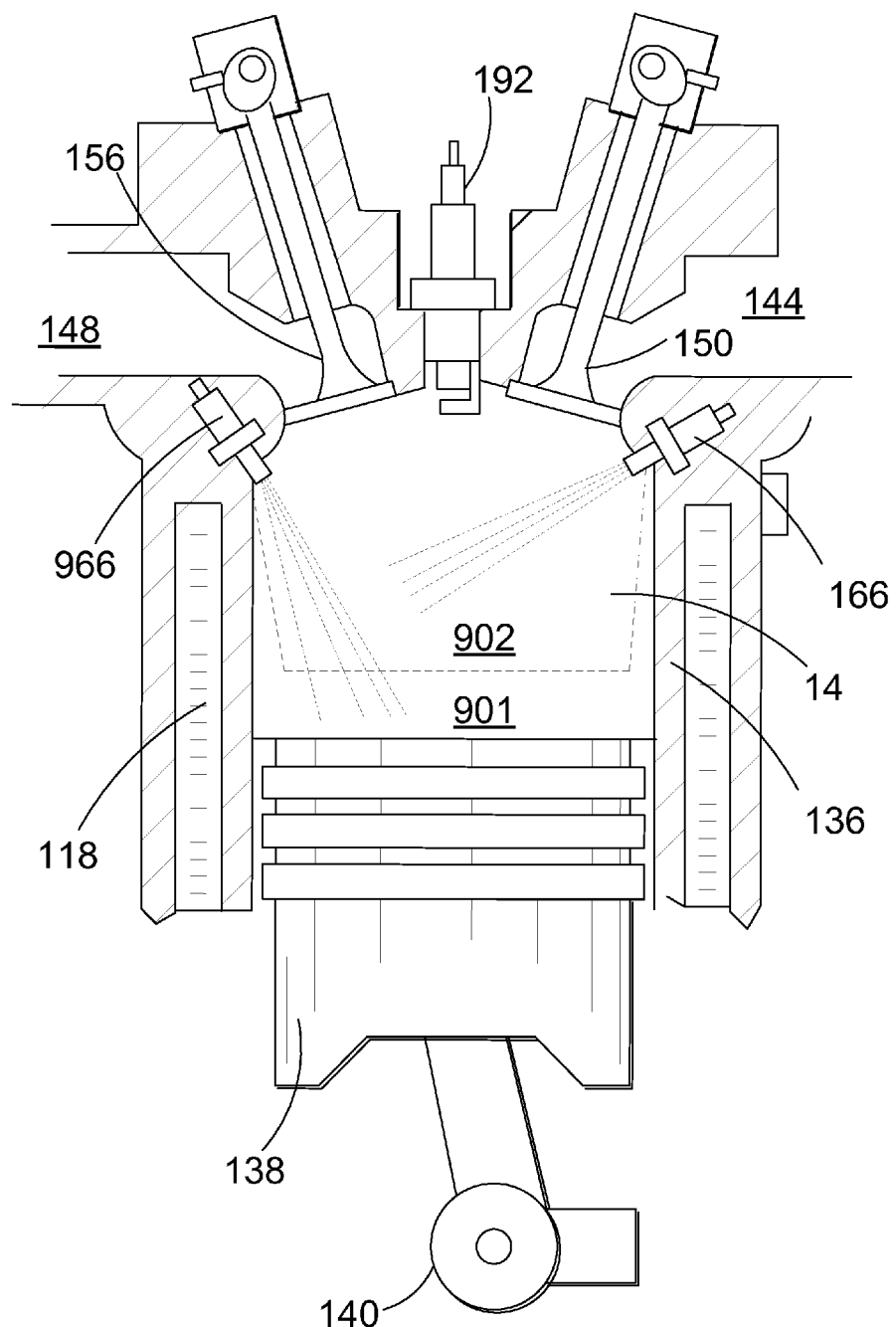

FIG. 9 schematically depicts an example embodiment of a cylinder of an internal combustion engine.

DETAILED DESCRIPTION

Figure 1:
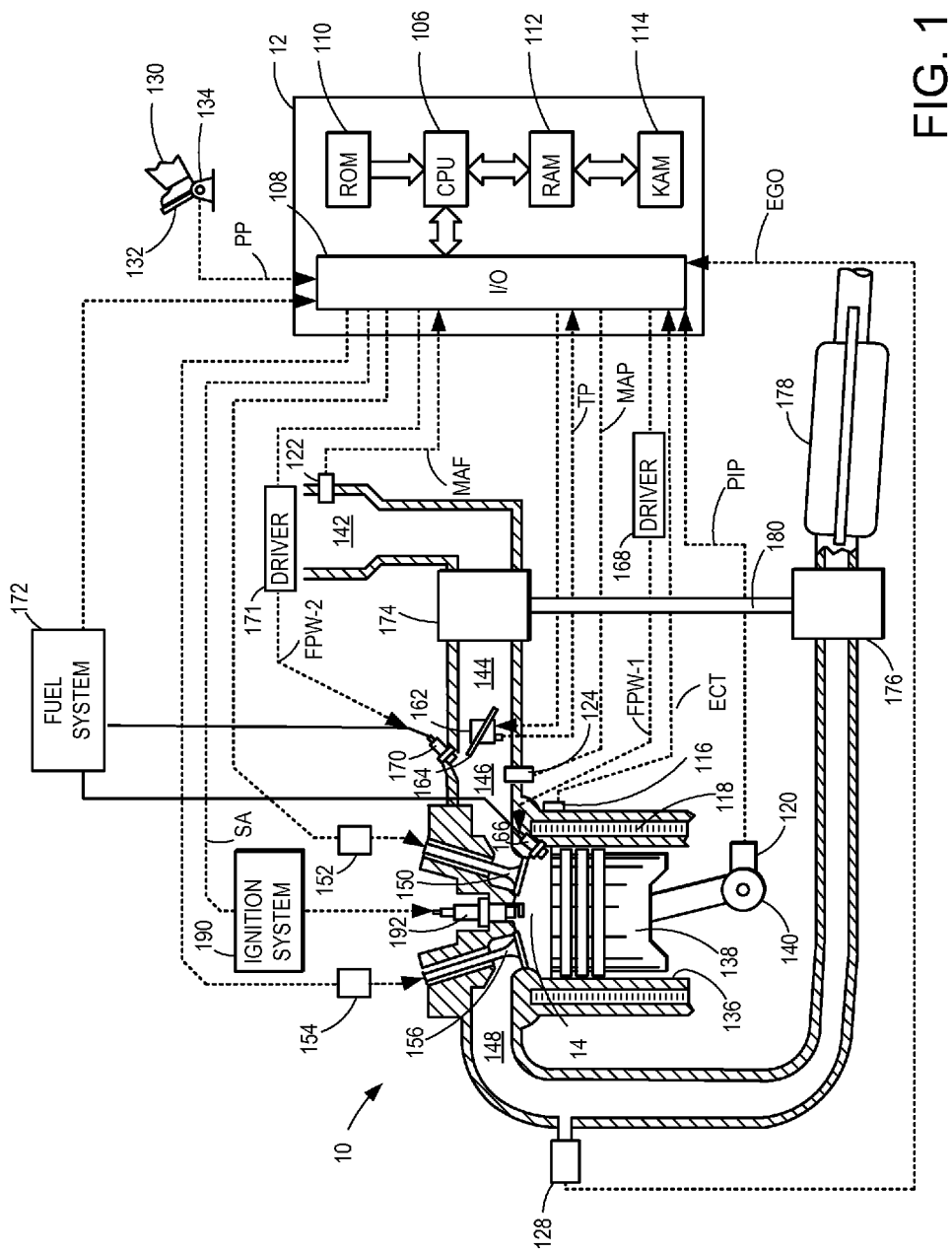
Figure 2:
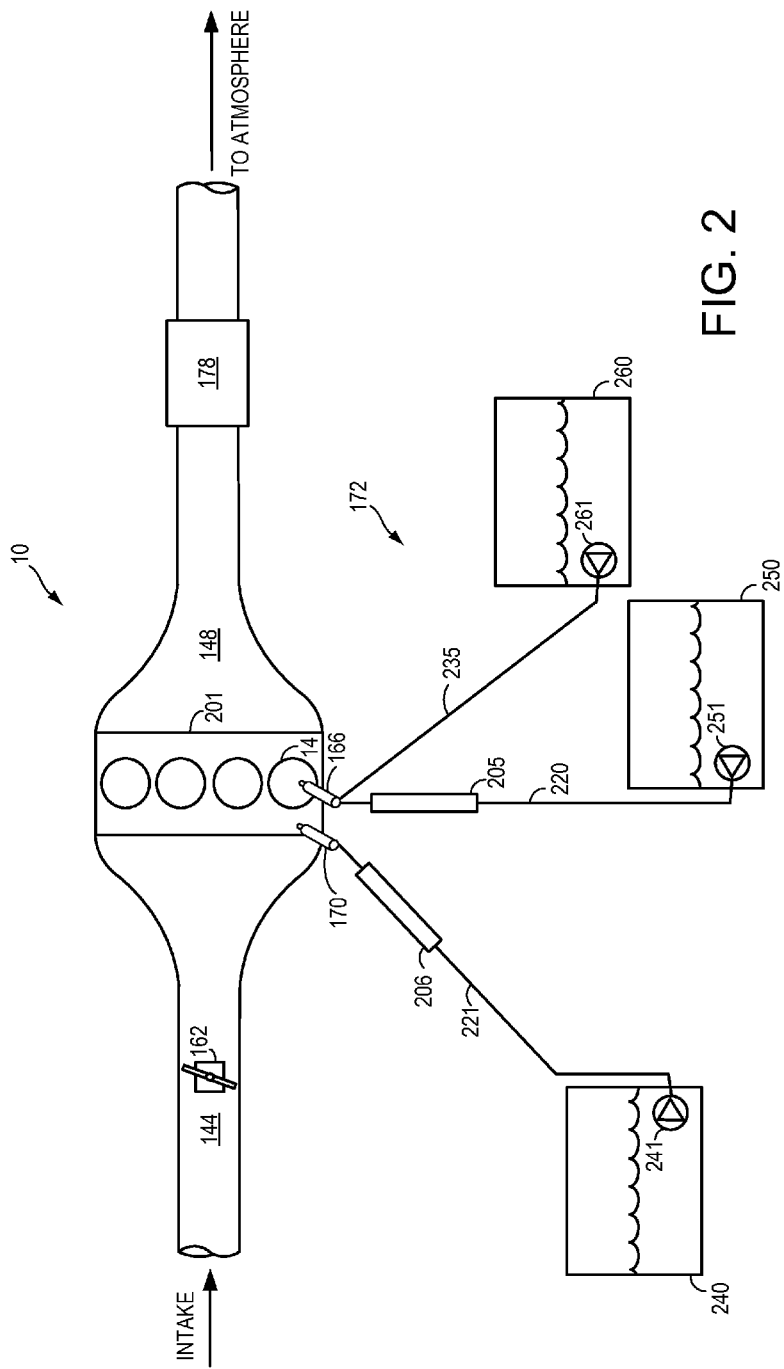

The following description relates to systems and methods for addressing overheating and engine knock in gaseous fueled engines, such as the engines schematically diagrammed in FIGS. 1 and 2. The systems may include a gaseous fuel tank coupled to a port-fuel injector and a secondary fuel tank of reservoir coupled to a direct-fuel injector. A controller may be programmed to control the rate and timing of fuel injection through a control routine, such as the routines described in FIGS. 3, 4, 6 and 8. The timing of fuel injection may be set to coincide with events during the combustion cycle of an engine cylinder, as depicted in FIGS. 5 and 7. Further, the direct-fuel injection may be controlled to be biased to injecting a fuel into regions of an engine cylinder prone to knocking, as schematically depicted in FIG. 9.

FIG. 1 depicts an example embodiment of a combustion chamber or cylinder of internal combustion engine 10. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. Cylinder (i.e. combustion chamber) 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 162 including a throttle plate 164 may be provided along an intake passage of the engine for varying the flow rate and/or pressure of intake air provided to the engine cylinders. For example, throttle 162 may be disposed downstream of compressor 174 as shown in FIG. 1, or may alternatively be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be any suitable sensor for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor. Emission control device 178 may be a three way catalyst (TWC), NOx trap, various other emission control devices, or combinations thereof.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 via actuator 152. Similarly, exhaust valve 156 may be controlled by controller 12 via actuator 154. During some conditions, controller 12 may vary the signals provided to actuators 152 and 154 to control the opening and closing of the respective intake and exhaust valves. The position of intake valve 150 and exhaust valve 156 may be determined by respective valve position sensors (not shown). The valve actuators may be of the electric valve actuation type or cam actuation type, or a combination thereof. The intake and exhaust valve timing may be controlled concurrently or any of a possibility of variable intake cam timing, variable exhaust cam timing, dual independent variable cam timing or fixed cam timing may be used. Each cam actuation system may include one or more cams and may utilize one or more of cam profile switching (CPS), variable cam timing (VCT), variable valve timing (VVT) and/or variable valve lift (VVL) systems that may be operated by controller 12 to vary valve operation. For example, cylinder 14 may alternatively include an intake valve controlled via electric valve actuation and an exhaust valve controlled via cam actuation including CPS and/or VCT. In other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen for example when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including two fuel injectors 166 and 170. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from high pressure fuel system 172 including a fuel tank, fuel pumps, a fuel rail, and driver 168. Alternatively, fuel may be delivered by a single stage fuel pump at lower pressure, in which case the timing of the direct fuel injection may be more limited during the compression stroke than if a high pressure fuel system is used. Further, while not shown, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel in proportion to the pulse width of signal FPW-2 received from controller 12 via electronic driver 171. Fuel may be delivered to fuel injector 170 by fuel system 172.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions such as described herein below. The relative distribution of the total injected fuel among injectors 166 and 170 may be referred to as a first injection ratio. For example, injecting a larger amount of the fuel for a combustion event via (port) injector 170 may be an example of a higher first ratio of port to direct injection, while injecting a larger amount of the fuel for a combustion event via (direct) injector 166 may be a lower first ratio of port to direct injection. Note that these are merely examples of different injection ratios, and various other injection ratios may be used. Additionally, it should be appreciated that port injected fuel may be delivered during an open intake valve event, closed intake valve event (e.g., substantially before an intake stroke, such as during an exhaust stroke), as well as during both open and closed intake valve operation. Similarly, directly injected fuel may be delivered during an intake stroke, as well as partly during a previous exhaust stroke, during the intake stroke, and partly during the compression stroke, for example. Further, the direct injected fuel may be delivered as a single injection or multiple injections. These may include multiple injections during the compression stroke, multiple injections during the intake stroke or a combination of some direct injections during the compression stroke and some during the intake stroke. When multiple direct injections are performed, the relative distribution of the total directed injected fuel between an intake stroke (direct) injection and a compression stroke (direct) injection may be referred to as a second injection ratio. For example, injecting a larger amount of the direct injected fuel for a combustion event during an intake stroke may be an example of a higher second ratio of intake stroke direct injection, while injecting a larger amount of the fuel for a combustion event during a compression stroke may be an example of a lower second ratio of intake stroke direct injection. Note that these are merely examples of different injection ratios, and various other injection ratios may be used.

As such, even for a single combustion event, injected fuel may be injected at different timings from a port and direct injector. Furthermore, for a single combustion event, multiple injections of the delivered fuel may be performed per cycle. The multiple injections may be performed during the compression stroke, intake stroke, or any appropriate combination thereof.

As described above, FIG. 1 shows only one cylinder of a multi-cylinder engine. As such each cylinder may similarly include its own set of intake/exhaust valves, fuel injector(s), spark plug, etc.

Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Fuel system 172 may include one fuel tank or multiple fuel tanks. In embodiments where fuel system 172 includes multiple fuel tanks, the fuel tanks may hold fuel with the same fuel qualities or may hold fuel with different fuel qualities, such as different fuel compositions. These differences may include different alcohol content, different octane, different heat of vaporizations, different fuel blends, and/or combinations thereof etc. In one example, fuels with different alcohol contents could include gasoline, ethanol, methanol, or alcohol blends such as E85 (which is approximately 85% ethanol and 15% gasoline) or M85 (which is approximately 85% methanol and 15% gasoline). Other alcohol containing fuels could be a mixture of alcohol and water, a mixture of alcohol, water and gasoline etc. In some examples, fuel system 172 may include a fuel tank holding a liquid fuel, such as gasoline, and also include a fuel tank holding a gaseous fuel, such as CNG. Fuel injectors 166 and 170 may be configured to inject fuel from the same fuel tank, from different fuel tanks, from a plurality of the same fuel tanks, or from an overlapping set of fuel tanks.

Controller 12 is shown in FIG. 1 as a microcomputer, including microprocessor unit 106, input/output ports 108, an electronic storage medium for executable programs and calibration values shown as read only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold.

Storage medium read-only memory 110 can be programmed with computer readable data representing instructions executable by processor 106 for performing the methods described below as well as other variants that are anticipated but not specifically listed. An example routine that may be performed by the controller is described at FIG. 3.

FIG. 2 shows a schematic diagram of a multi-cylinder engine in accordance with the present disclosure. As depicted in FIG. 1, internal combustion engine 10 includes cylinders 14 coupled to intake passage 144 and exhaust passage 148. Intake passage 144 may include throttle 162. Exhaust passage 148 may include emissions control device 178.

Cylinders 14 may be configured as part of cylinder head 201. In FIG. 2, cylinder head 201 is shown with 4 cylinders in an inline configuration. In some examples, cylinder head 201 may have more or fewer cylinders, for example six cylinders. In some examples, the cylinders may be arranged in a V configuration or other suitable configuration.

Cylinder head 201 is shown coupled to fuel system 172. Cylinder 14 is shown coupled to fuel injectors 166 and 170. Although only one cylinder is shown coupled to fuel injectors, it is to be understood that all cylinders 14 included in cylinder head 201 may also be coupled to one or more fuel injectors. In this example embodiment, fuel injector 166 is depicted as a direct fuel injector and fuel injector 170 is depicted as a port fuel injector. Each fuel injector may be configured to deliver a specific quantity of fuel at a specific time point in the engine cycle in response to commands from controller 12. One or both fuel injectors may be utilized to deliver combustible fuel to cylinder 14 during each combustion cycle. The timing and quantity of fuel injection may be controlled as a function of engine operating conditions. Control of the timing and quantity of fuel injection will be discussed further below and with regards to FIGS. 3-9.

Fuel injector 170 is shown coupled to fuel rail 206. Fuel rail 206 may be coupled to fuel line 221. Fuel line 221 may be coupled to fuel tank 240. Fuel pump 241 may be coupled to fuel tank 240 and fuel line 221. Fuel rail 206 may include a plurality of sensors, including a temperature sensor and a pressure sensor. Similarly, fuel line 221 and fuel tank 240 may include a plurality of sensors, including temperature and pressure sensors. Fuel tank 240 may also include a refueling port.

In some embodiments, fuel tank 240 may contain a gaseous fuel, such as CNG, methane, LPG, hydrogen gas, etc. In embodiments where fuel tank 240 contains a gaseous fuel, a tank valve may be coupled to fuel line 221 upstream of fuel pump 241. A line valve may be coupled to fuel line 221 upstream of the tank valve. A pressure regulator may be coupled to fuel line 221 upstream of the line valve. Fuel line 221 may also be coupled to a coalescing filter and may further include a pressure relief valve upstream of fuel rail 206.

Fuel injector 166 is shown coupled to fuel rail 205. Fuel rail 205 may be coupled to fuel line 220. Fuel line 220 may be coupled to fuel tank 250. Fuel pump 251 may be coupled to fuel tank 250 and fuel line 220. Fuel rail 205 may include a plurality of sensors, including a temperature sensor and a pressure sensor. Similarly, fuel line 220 and fuel tank 250 may include a plurality of sensors, including temperature and pressure sensors. Fuel tank 250 may also include a refueling port. In some embodiments, fuel tank 250 may contain a liquid fuel, such as gasoline, diesel, ethanol, E85, etc. In embodiments where fuel tank 250 contains a liquid fuel and fuel tank 240 contains a gaseous fuel, fuel rail 205 may be configured as a higher-pressure fuel rail and fuel rail 206 may be configured as a lower pressure fuel rail.

Fuel injector 166 is also shown coupled to supply line 235. Supply line 235 may be coupled to reservoir 260. Reservoir 260 may include pump 261. In some embodiments, pump 261 may be replaced with an aspirator. Supply line 235 is shown coupled directly to injector 166, but may be coupled to fuel rail 205 or a separate pressurization chamber. Supply line 235 may be coupled to a separate injector, which may be configured as a direct injector or a port injector.

In some embodiments, reservoir 260 may be a windshield wiper fluid tank, radiator coolant tank, or other liquid holding tank. In these examples, reservoir 260 may be coupled to additional supply lines via additional pumps or aspirators. Reservoir 260 may contain a fluid such as ethanol, methanol, an ethanol/water or methanol/water solution, liquid EGR, gasoline, etc. or may contain a gas such as $H_2$, CO, gaseous EGR, etc. In embodiments where reservoir 260 contains a fluid, the fluid may have a plurality of different qualities, including but not limited to include different alcohol content, different water content, different octane, different heat of vaporizations, different fuel blends, different water contents, different flammability limits, and/or combinations thereof etc. In embodiments where reservoir 260 contains a gas, a tank valve may be coupled to supply line 235 upstream of fuel pump 261. A line valve may be coupled to fuel line 235 upstream of the tank valve. A pressure regulator may be coupled to fuel line 235 upstream of the line valve. Fuel line 235 may also be coupled to a coalescing filter and may further include a pressure relief valve. Fuel line 235 may be coupled to one or more pressure and/or temperature sensors in communication with a controller.

The timing and flow rates of the direct injection of a secondary fuel or diluent may be coordinated to coincide with events occurring during the combustion sequence. Further, the timing and flow rates of the direct injection of a secondary fuel or diluent may be determined as a function of engine operating conditions or as a function of the composition of the secondary fuel or diluent. Further, spark timing and boost pressure may be adjusted in accordance with the timing and flow rates of the direct injection of a secondary fuel or diluent.

Figure 3:
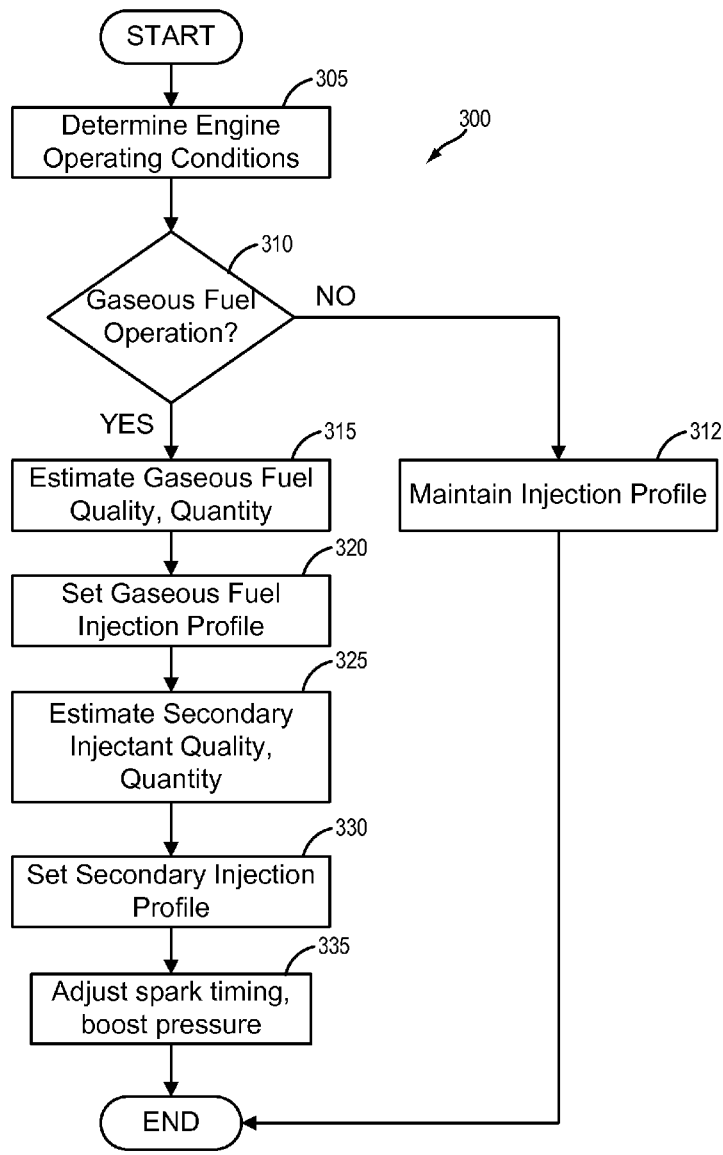
FIG. 3 depicts an example high level flow chart for operating an internal combustion engine including a port-fuel injection system and a secondary direct injection system according to the present disclosure.

FIG. 3 shows a flowchart depicting method 300 in accordance with the present disclosure. Method 300 may be carried out by controller 12. Method 300 may begin at 305 by determining engine operating conditions. Engine operating conditions may be measured, estimated or inferred, and may include various vehicle conditions, such as vehicle speed, as well as various engine operating conditions, such as engine speed, engine temperature, exhaust temperature, boost level, MAP, MAF, torque demand, horsepower demand, etc. Determining engine operating conditions may include determining whether the engine is operating at a high load condition. Herein, a high load condition may be defined as a load that is greater than an upper threshold, for example, 75% of maximum load, as compared to a load that is greater than a lower threshold.

At 310 the method may include determining whether the engine is operating in a gaseous fuel mode. For vehicles that run solely on CNG or another gaseous fuel, the vehicle may be assumed to be operating in a gaseous fuel mode, for example operating on a first gaseous fuel that is one or more of CNG and methane. For bi-fuel, multi-fuel or hybrid engines, the method may include determining the current rate of gaseous fuel usage. If the engine is not operating in a gaseous fuel mode, method 300 may proceed to 312. At 312, method 300 may include maintaining the current injection profile. Method 300 may then end. If the engine is operating in a gaseous fuel mode, or if gaseous fuel usage is above a threshold, method 300 may proceed to 315.

At 315, method 300 may include measuring or estimating the quality and quantity of gaseous fuel remaining in a fuel tank. The quantity of fuel may be measured using a pressure sensor coupled to the fuel tank or fuel line containing the gaseous fuel. The quality of gaseous fuel may include the octane, ignitability, purity, etc. and may be measured by one or more on-board sensors, estimated based on measured engine operating conditions, inferred or determined at a refueling event, or evaluated through other means.

At 320, method 300 may include setting a gaseous fuel injection profile as a function of the conditions, measurements and estimations discussed above. The fuel injection profile may include a quantity of fuel injected and may include a timing of fuel injection relative to the combustion cycle of the engine. Example fuel injection profiles are discussed further below and with regards to FIGS. 4-8. The fuel injection profile may in turn be executed by a controller delivering signals to a fuel injector, and further regulating the pressure of gaseous fuel in a fuel rail or fuel line by regulating a pump or aspirator. The fuel injection profile may be a function of a desired A/F ratio. For example, the quantity of fuel injected may be increased in order to increase maximum power by running rich, or decreased in order to maximize fuel economy by running lean.

At 325, method 300 may include measuring or estimating the quality and quantity of a secondary injectant. As discussed above and with regard to FIG. 2, the secondary injectant may be a secondary fuel source contained in a fuel tank. For example, in a bi-fuel vehicle, the secondary injectant may be gasoline. The second liquid fuel may be one or more of a methanol solution and an ethanol solution. In some embodiments, the secondary injectant may be a diluent contained in a reservoir. For example, the secondary injectant may be a methanol solution or windshield wiper fluid contained in a windshield wiper fluid tank. In some examples, there may be multiple secondary injectants available, for example gasoline and methanol solution. In such examples, all possible secondary injectants may be evaluated. Alternatively, if the secondary injectants have vastly different properties, the quantity and quality of one or more secondary injectants may be evaluated depending on the engine operating conditions and desired effect of the secondary injection.

At 330, method 300 may include setting a secondary injection profile as a function of the conditions, measurements and estimations discussed above. The secondary injection profile may include a quantity of fuel and/or diluent injected and may include a timing of a secondary injection relative to the combustion cycle of the engine and relative to the timing of the primary fuel injection. Example secondary injection profiles are discussed further below and with regards to FIGS. 4-8. The secondary injection profile may in turn be executed by a controller delivering signals to a fuel injector, and further regulating the pressure of fuel or diluent in a fuel rail, fuel line or delivery line by regulating a pump or aspirator. For example, a diluent may be injected to increase the density of a gas charge entering a combustion chamber, or to decrease the temperature of exhaust gas exiting the cylinder. A diluent may be injected to alter the A/F ratio in a combustion chamber. For example, a first quantity of a first gaseous fuel injected may generate operation of the engine with a substantially stoichiometric air-fuel ratio, and a second quantity of a second liquid fuel injected may lower the air-fuel ratio to a substantially rich air-fuel ratio. In another example a first quantity of a first gaseous fuel may allow operation of the engine with a substantially lean air-fuel ratio, and a second quantity of a second liquid fuel injected may lower the air-fuel ratio to a substantially stoichiometric air-fuel ratio.

At 335, method 300 may include adjusting the spark timing and boost pressure as a function of the engine conditions and the injection profiles of gaseous fuel and secondary injectant. This may include advancing or retarding the spark timing and increasing or decreasing the boost pressure. Spark timing adjusting and boost pressure setting may be implemented by a controller, and may implement a lookup map to select the optimal spark timing and boost pressure for a current set of operating conditions.

The fuel injection profile, secondary injection profile, spark timing and boost pressure may be implemented with a lookup map where desired engine performance qualities are mapped to injection profiles and spark timing profiles and as a function of the quality and quantity of fuel and secondary injectant available. The fuel injection profile, secondary injection profile, spark timing and boost pressure may be determined sequentially and as a function of each other, or may be determined concurrently, for example, through a lookup map. For example, the secondary injection profile may be determined as a function of the boost pressure. The fuel injection profile, secondary injection profile, spark timing and boost pressure may be set iteratively through a feedback loop and may further be continuously updated as a function of vehicle speed, engine load, or other engine operating conditions.

Figure 4:
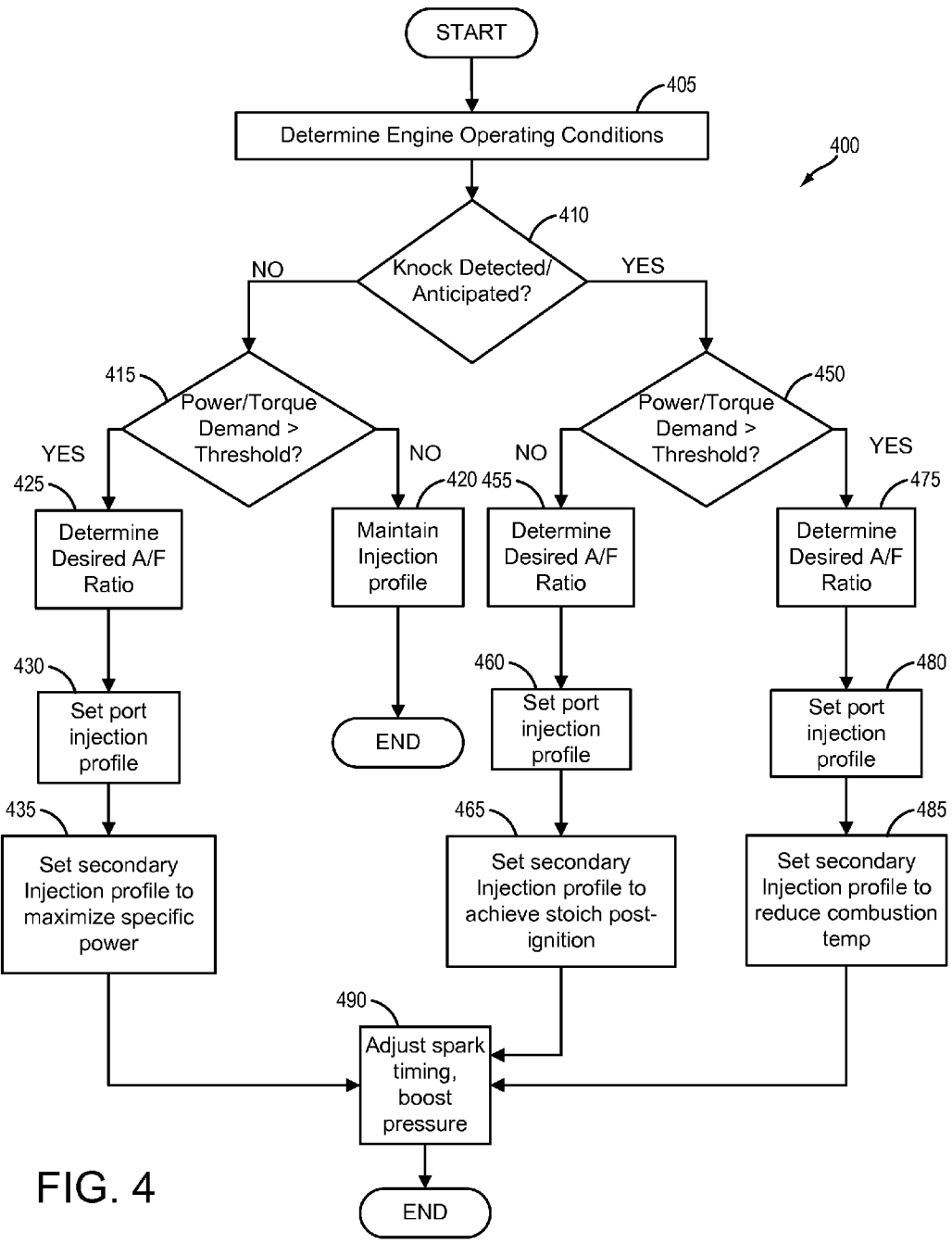
FIG. 4 depicts an example flow chart for operating a port-fuel injection system and a secondary direct injection system as a function of engine operating conditions.
Figure 5:
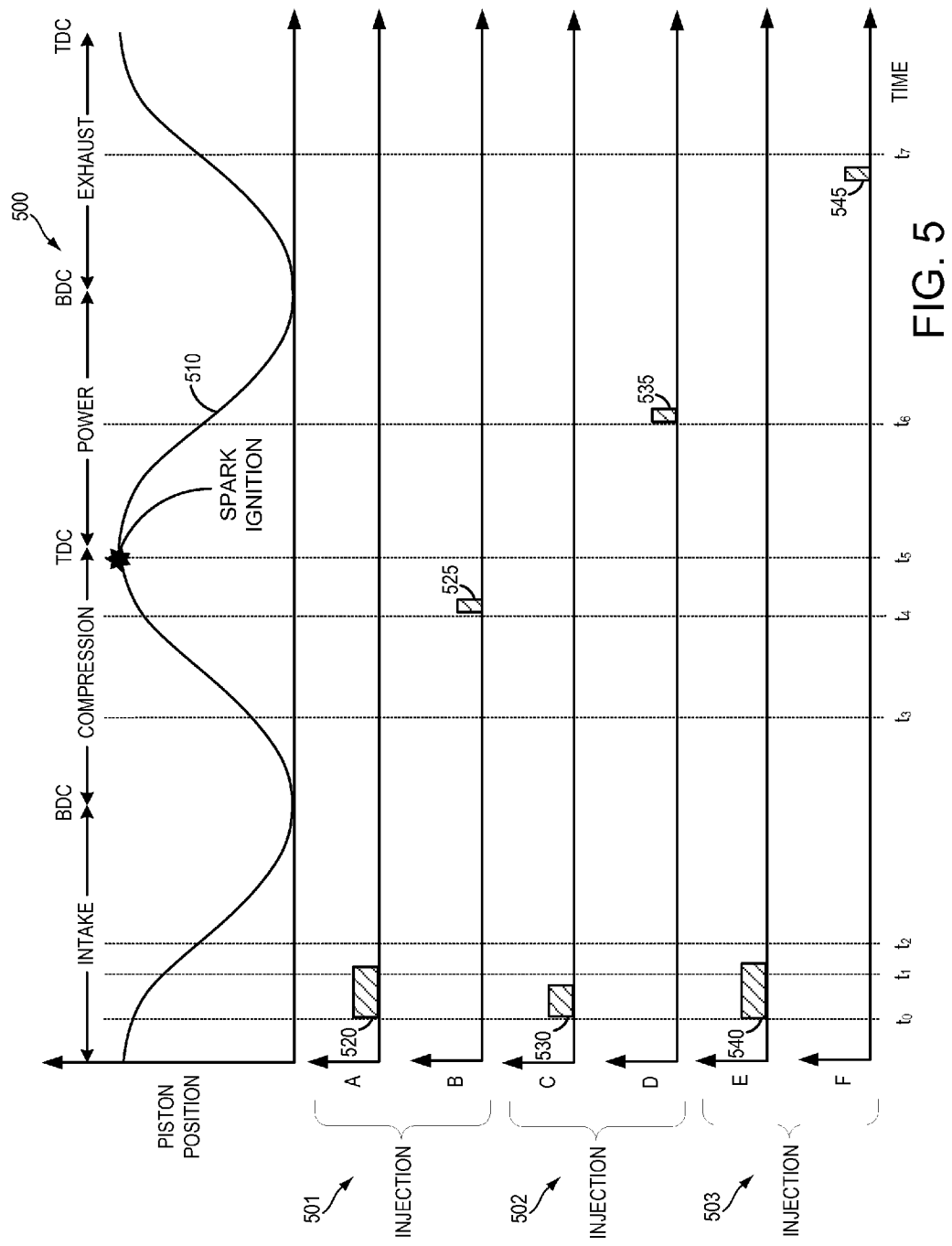
FIG. 5 is a graphical representation of an example timeline for vehicle operation and the operation of a port-fuel injection system and secondary direct injection system according to the present disclosure.

FIG. 4 shows a flowchart depicting method 400 in accordance with the present disclosure. Method 400 may be carried out by controller 12. Method 400 may be implemented as a subroutine of another method, for example method 300. In particular, method 400 may be implemented in a gaseous fueled, bi-fueled or multi-fueled vehicle comprising a reservoir of a secondary injectant, for example, the system depicted in FIG. 2. Method 400 may be executed as part of a routine to mitigate engine knock, a routine to maximize specific power, or to otherwise control the ignition cycle of an engine. Method 400 will be described herein with reference to a vehicle comprising a turbocharged CNG engine and a reservoir of water, methanol solution or ethanol solution, but it is to be understood that the method could be implemented in other vehicles without departing from the scope of this disclosure.

Method 400 may begin at 405 by determining engine operating conditions. Engine operating conditions may be measured, estimated or inferred, and may include various vehicle conditions, such as vehicle speed, as well as various engine operating conditions, such as engine speed, engine temperature, exhaust temperature, boost level, MAP, MAF, torque demand, horsepower demand, etc. At 410, method 400 may include determining if engine knock is currently detected, or if operating conditions anticipate engine knock occurring unless one or more engine parameters are altered. For example, engine knock may be detected by a knock sensor. In some examples, engine knock may be anticipated as a function of cylinder pressure, cylinder temperature, engine operating conditions, fuel quality, etc.

If engine knock is not detected or anticipated, method 400 may proceed to 415. At 415, method 400 may include determining whether the current torque demand or current horsepower demand is greater than a threshold. The threshold(s) may be predetermined values, or may be calculated as a function of current engine operating conditions. In some examples, it may be possible to predict or anticipate an increase in torque or horsepower demand, for example, an on-board GPS may sense an approaching incline that would require increased torque or horsepower to maintain the current vehicle speed.

If the current torque and horsepower demands are less than the threshold(s), method 400 may proceed to 420, where the method may include maintaining the current injection profile. When the current injection profile has been maintained, method 400 may end.

If the current torque and/or horsepower demands are greater than the threshold(s), method 400 may proceed to 425. At 425, method 400 may include determining a desired A/F ratio. For example, an increase in torque demand may indicate that the A/F ratio should be decreased from the current A/F ratio and biased towards a rich-burning ratio. At 430, method 400 may include setting the port fuel injection profile. The port fuel injection profile may include the timing and quantity of gaseous fuel to be port injected into the intake manifold.

At 435, method 400 may include setting the secondary injection profile to maximize specific power. For example, specific power may be maximized by direct-injecting a quantity of secondary injectant following port injection of the gaseous fuel and prior to spark ignition. Example injection profiles are depicted in FIG. 5.

FIG. 5 depicts example timing plots for port fuel injection and secondary injection profiles relative to an engine combustion cycle. Curve 510 represents piston position for one cylinder undergoing a four-stroke engine cycle, including intake, compression, power and ignition strokes. The plot may be considered to loop indefinitely. In this example, the exhaust valve opens at time point $t_7$ and closes at time point $t_2$. The intake valve opens at time $t_1$ and closes at time $t_3$. Spark ignition occurs at time $t_5$. Spark ignition is shown as occurring at a few degrees prior to the piston reaching top dead center (TDC), but may be advanced or retarded depending on engine operating conditions.

A timing plot 501 is shown for setting an injection profile to maximize specific power, as described above with regards to FIG. 4. Timing plot 501 includes injection profile A and injection profile B. Injection profile A is a port injection profile for port injecting CNG. Injection profile B is a direct injection profile for direct injecting a secondary injectant, such as water or methanol solution. Block 520 represents port injection of CNG. In this example, the port injection of CNG begins at a time point ($t_0$) during the intake stroke, but prior to the opening of the intake valve at $t_1$. Block 525 represents direct injection of methanol solution. In this example, the direct injection of methanol solution occurs at a time point ($t_4$) during the compression stroke, but prior to spark ignition. In this way, CNG may be port-injected at a stoich or rich A/F ratio. In this way, the injection of methanol solution prior to spark ignition may lower the effective A/F ratio and allow for a richer burning than for CNG alone. Rich burning of CNG/methanol solution may allow for specific power of the engine to be maximized in response to an increased demand for torque or horsepower.

Herein, operating an engine at a stoich (or stoichiometric) A/F ratio may refer to A/F ratios that are substantially stoichiometric over time. For example, an engine may operate within 5% of a stoichiometric ratio and be considered stoichiometric, or the A/F ratio may oscillate within 5% above and below a stoichiometric A/F ratio and be considered stoichiometric for the purposes of this disclosure.

Operating an engine at a rich A/F ratio may refer to A/F ratios that are richer than stoichiometric A/F ratios as described above. An engine may oscillate between two rich A/F ratios over time and be considered operating at a substantially rich A/F ratio as long as there are no excursions to a lean A/F ratio.

Similarly, operating an engine at a lean A/F ratio may refer to A/F ratios that are leaner than stoichiometric A/F ratios as described above. An engine may oscillate between two lean A/F ratios over time and be considered operating at a substantially lean A/F ratio as long as there are no excursions to a rich A/F ratio.

Returning to FIG. 4, if engine knock is detected or anticipated at 410, method 400 may proceed to 450. At 450, method 400 may include determining whether the current torque demand or current horsepower demand is greater than a threshold. As described above, the threshold(s) may be predetermined values, or may be calculated as a function of current engine operating conditions. In some examples, it may be possible to predict or anticipate an increase in torque or horsepower demand.

If it is determined that the current torque and/or horsepower demands are less than the threshold(s), method 400 may proceed to 455. At 455, method 400 may include determining a desired A/F ratio. For example, if the engine is knocking or about to knock, and a low torque demand is required, a lean A/F ratio may be desired. At 460, method 400 may include setting the port fuel injection profile. The port fuel injection profile may include the timing and quantity of gaseous fuel to be port injected into the intake manifold.

At 465, method 400 may include setting the secondary injection profile to achieve a stoichiometric A/F ratio. For example, methanol solution may be injected following ignition and during the power stroke to reduce the A/F ratio within the cylinder.

An example injection profile for the above condition is depicted by timing plot 502 in FIG. 5. Timing plot 502 includes injection profile C and injection profile D. Injection profile C is a port injection profile for port injecting CNG. Injection profile D is a direct injection profile for direct injecting a secondary injectant, such as water or methanol solution. Block 530 represents port injection of CNG. In this example, the port injection of CNG begins at a time point ($t_0$) during the intake stroke, but prior to the opening of the intake valve at $t_1$. In this example, block 530 represents a quantity of CNG that would result in a lean-burning A/F ratio. Block 535 represents direct injection of methanol solution. In this example, the direct injection of methanol solution occurs at a time point ($t_6$) during the power stroke, following spark-ignition. In this way, CNG may be port-injected at a lean A/F ratio to avoid engine knock, and methanol solution may be direct injected to control the A/F ratio to be substantially stoichiometric during combustion.

Returning to FIG. 4, at 450 if it is determined that the current torque and/or horsepower demands are greater than the threshold(s), method 400 may proceed to 475. At 475, method 400 may include determining a desired A/F ratio. For example, if the engine is knocking or about to knock, and a high torque demand is required, a rich A/F ratio may be desired. At 480, method 400 may include setting the port fuel injection profile. The port fuel injection profile may include the timing and quantity of gaseous fuel to be port injected into the intake manifold.

At 485, method 400 may include setting the secondary injection profile to reduce combustion temperature. For example, methanol solution may be injected following combustion and during the exhaust stroke to reduce the temperature of exhaust exiting the cylinder.

An example injection profile for the above condition is depicted by timing plot 503 in FIG. 5. Timing plot 503 includes injection profile E and injection profile F. Injection profile E is a port injection profile for port injecting CNG. Injection profile F is a direct injection profile for direct injecting a secondary injectant, such as water or methanol solution. Block 540 represents port injection of CNG. In this example, the port injection of CNG begins at a time point ($t_0$) during the intake stroke, but prior to the opening of the intake valve at $t_1$. In this example, block 540 represents a quantity of CNG that would result in a stoich or rich-burning A/F ratio. Block 545 represents direct injection of methanol solution. In this example, the direct injection of methanol solution occurs at a time point ($t_4$) during the exhaust stroke, but prior to opening of the exhaust valve. In this way, CNG may be port-injected at a stoich or rich A/F ratio to maximize engine power, and methanol solution may be direct injected to cool the temperature of the combustion cylinder and accompanying exhaust gas exiting the combustion cylinder, thereby mitigating engine knock. In some examples, the direct injection of methanol solution may overlap with the opening of the exhaust valve, or may begin following the opening of the exhaust valve. Multiple direct injections of methanol solution may occur during an engine cycle. For example, a first injection may occur at time point t4, followed by a second injection at time point t7. In this way, specific engine power may be maximized while maintaining engine temperature below a threshold and while also mitigating engine knock.

Returning to FIG. 4, when the port injection profile and secondary injection profile have been set, method 400 may proceed to 490. At 490, method 400 may include adjusting spark timing and/or adjusting boost pressure.

The port injection profile, secondary injection profile, spark timing and boost pressure may be implemented with a lookup map where desired engine performance qualities are mapped to injection profiles and spark timing profiles and as a function of the quality and quantity of fuel and secondary injectant available. The fuel injection profile, secondary injection profile, spark timing and boost pressure may be determined sequentially and as a function of each other, or may be determined concurrently, for example, through a lookup map. For example, the secondary injection profile may be determined as a function of the boost pressure. The fuel injection profile, secondary injection profile, spark timing and boost pressure may be set iteratively through a feedback loop and may further be continuously updated as a function of vehicle speed, engine load, desired A/F ratio, engine knock or other engine operating conditions.

Figure 6:
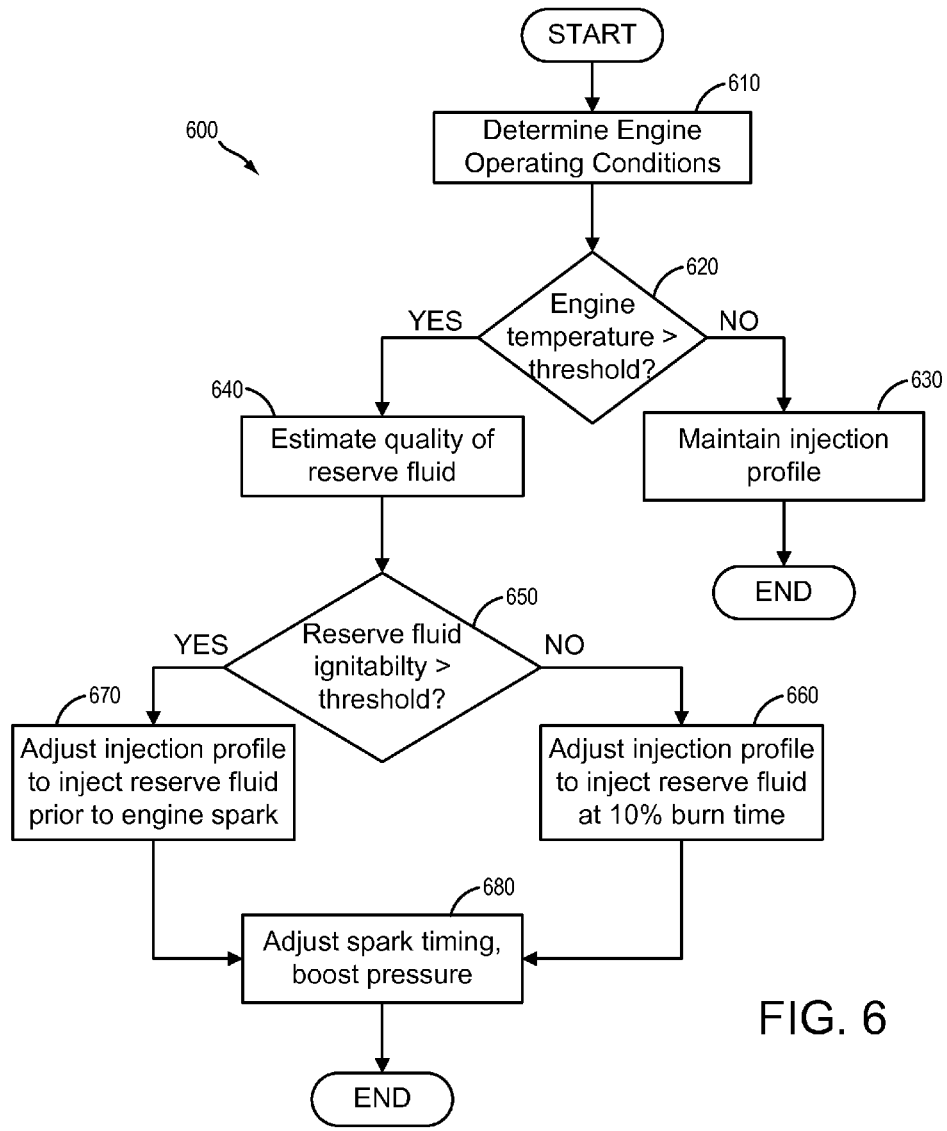
FIG. 6 depicts an example flow chart for operating a port-fuel injection system and a secondary direct injection system as a function of the ignitability of a reserve fluid.
Figure 7:
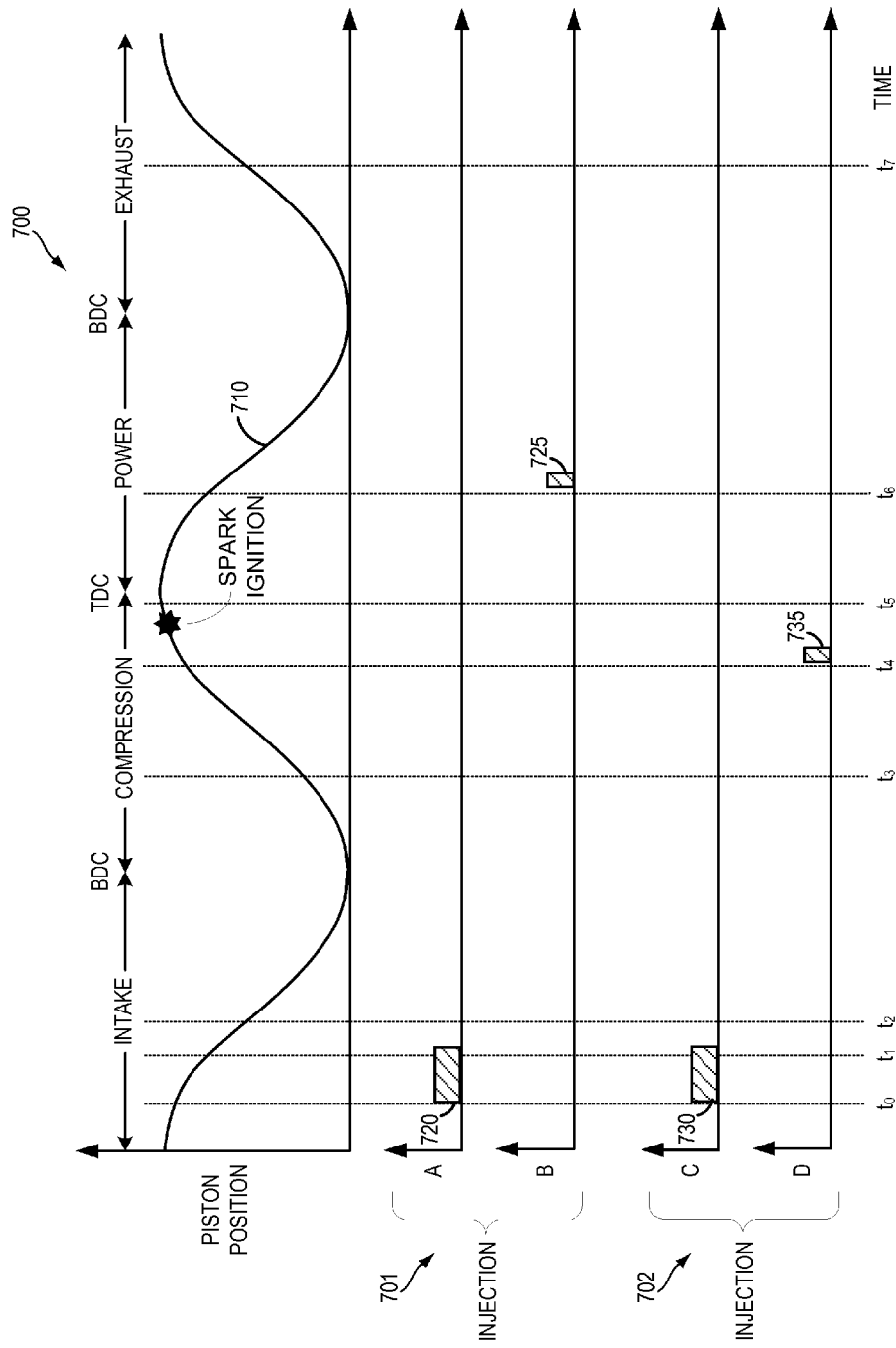
FIG. 7 is a graphical representation of an example timeline for vehicle operation and the operation of a port-fuel injection system and secondary direct injection system according to the present disclosure.

FIG. 6 shows a flowchart depicting method 600 in accordance with the present disclosure. Method 600 may be carried out by controller 12. Method 600 may be implemented as a subroutine of another method, for example method 300. In particular, method 600 may be implemented in a gaseous fueled, bi-fueled or multi-fueled vehicle comprising a reservoir of a secondary injectant, for example, the system depicted in FIG. 2. Method 600 may be executed as part of a routine to mitigate engine knock, a routine to maximize specific power, or to otherwise control the ignition cycle of an engine. Method 600 will be described herein with reference to a vehicle comprising a turbocharged CNG engine and a reservoir that may hold one of a plurality of secondary injectants with differing properties, but it is to be understood that the method could be implemented in other vehicles without departing from the scope of this disclosure.

Method 600 may begin at 610 by determining engine operating conditions. Engine operating conditions may be measured, estimated or inferred, and may include various vehicle conditions, such as vehicle speed, as well as various engine operating conditions, such as engine speed, engine temperature, exhaust temperature, boost level, MAP, MAF, torque demand, horsepower demand, etc.

At 620, method 600 may include determining whether the engine temperature is greater than a threshold. The threshold may be a predetermined temperature, or may be determined as a function of engine operating conditions. In some embodiments, exhaust temperature may be compared to a threshold in addition to, or instead of engine temperature. If the engine temperature is below the threshold, method 600 may move to 630. At 630, method 600 may include maintaining the current injection profile. When the current injection profile has been maintained, method 600 may end.

If the engine temperature is above the threshold, method 600 may proceed to 640. At 640, method 600 may include measuring or estimating the quality of reserve fluid. As discussed above and with regard to FIGS. 2 and 3, the secondary injectant may be a secondary fuel source contained in a fuel tank. For example, in a bi-fuel vehicle, the secondary injectant may be gasoline. In another example, the secondary injectant may be a diluent contained in a reservoir. For example, the secondary injectant may be a methanol solution contained in a windshield washer fluid tank. In some examples, there may be multiple secondary injectants available, for example gasoline and methanol solution. In such examples, all possible secondary injectants may be evaluated. Alternatively, if the secondary injectants have vastly different properties, the quantity and quality of one or more secondary injectants may be evaluated depending on the engine operating conditions and desired effect of the secondary injection.

At 650, method 600 may include comparing the ignitability of the reserve fluid to a threshold. If the reserve fluid has ignitability below the threshold, method 600 may proceed to 660. At 660, method 600 may include adjusting an injection profile to inject a quantity of reserve fluid at 10% burn time. In other words, a secondary injectant with a low ignitability may be injected at a predetermined time following spark ignition.

If the reserve fluid has ignitability above the threshold, method 600 may proceed to 670. At 670, method 600 may include adjusting an injection profile to inject a quantity of reserve fluid prior to spark ignition. In other words, a secondary injectant with a high ignitability may be injected at a predetermined time prior to spark ignition.

When the injection profile has been adjusted as a function of secondary injectant ignitability, method 600 may proceed to 680. At 680, method 600 may include adjusting spark timing and/or adjusting boost pressure.

The secondary injection profile, spark timing and boost pressure may be implemented with a lookup map where desired engine performance qualities are mapped to injection profiles and spark timing profiles and as a function of the quality and quantity of fuel and secondary injectant available. The secondary injection profile, spark timing and boost pressure may be determined sequentially and as a function of each other, or may be determined concurrently, for example, through a lookup map. The secondary injection profile, spark timing and boost pressure may be set iteratively through a feedback loop and may further be continuously updated as a function of vehicle speed, engine load, desired A/F ratio, engine knock or other engine operating conditions.

For example, the timing of the secondary injection may be adjusted as a function of the boost pressure. For a secondary injectant with a relatively low ignitability, the timing of the secondary injection following spark ignition may be inversely proportionate to boost pressure. In other words, at a high boost pressure, the timing may be adjusted to be closer to spark ignition than for a lower boost pressure, where the timing of injection may be further from spark ignition.

FIG. 7 depicts an example timing plot 700 for port fuel injection and secondary injection profiles relative to an engine combustion cycle. Curve 710 represents piston position for one cylinder undergoing a four-stroke engine cycle, including intake, compression, power and ignition strokes. The plot may be considered to loop indefinitely. In this example, the exhaust valve opens at time point $t_7$ and closes at time point $t_2$. The intake valve opens at time $t_1$ and closes at time $t_3$. Spark ignition occurs at time $t_5$. Spark ignition is shown as occurring at a few degrees prior to the piston reaching top dead center (TDC), but may be advanced or retarded depending on engine operating conditions.

An injection plot 701 is shown for setting an injection profile for a secondary injectant with low ignitability, as described above with regards to FIG. 6. Timing plot 701 includes injection profile A and injection profile B. Injection profile A is a port injection profile for port injecting CNG. Injection profile B is a direct injection profile for direct injecting a secondary injectant with low ignitability, such as water or methanol solution. Block 720 represents port injection of CNG. In this example, the port injection of CNG begins at a time point ($t_0$) during the intake stroke, but prior to the opening of the intake valve at $t_1$. Block 725 represents direct injection of methanol solution. In this example, the direct injection of methanol solution occurs at a time point ($t_6$) during the power stroke, following spark ignition and following 10% burn time. In this way, the injection of methanol solution following spark ignition may lower the effective A/F ratio and allow for a richer burning than for CNG alone. By injecting methanol solution at time $t_6$, the poor ignitability of methanol solution does not affect establishment of a flame kernel. The expansion work done by the combustion event may increase, and the temperature of the exhaust may decrease. In some examples, the injection timing may be delayed proportionally to a decrease in the ignitability of the liquid fuel or diluent, while the injection time point is after flame kernel formation. The timing of the injection of methanol solution may occur between spark ignition and TDC. In this way, rich burning of CNG/methanol solution may allow for specific power of the engine to be maximized in response to an increased demand for torque or horsepower, while also mitigating engine knock by decreasing the maximum combustion temperature.

An injection plot 702 is shown for setting an injection profile for a secondary injectant with high ignitability, as described above with regards to FIG. 6. Timing plot 702 includes injection profile C and injection profile D. Injection profile C is a port injection profile for port injecting CNG. Injection profile D is a direct injection profile for direct injecting a secondary injectant with high ignitability, such as $H_2$ or gasoline. Block 730 represents port injection of CNG. In this example, the port injection of CNG begins at a time point ($t_0$) during the intake stroke, but prior to the opening of the intake valve at $t_1$. Block 735 represents direct injection of gasoline. In this example, the direct injection of gasoline occurs at a time point ($t_4$) during the compression stroke, prior to spark ignition. In this way, the injection of gasoline prior to spark ignition may lower the effective A/F ratio and allow for a richer burning than for CNG alone. Rich burning of CNG/gasoline may allow for specific power of the engine to be maximized in response to an increased demand for torque or horsepower, while also mitigating engine knock by decreasing the maximum combustion temperature.

Figure 8:
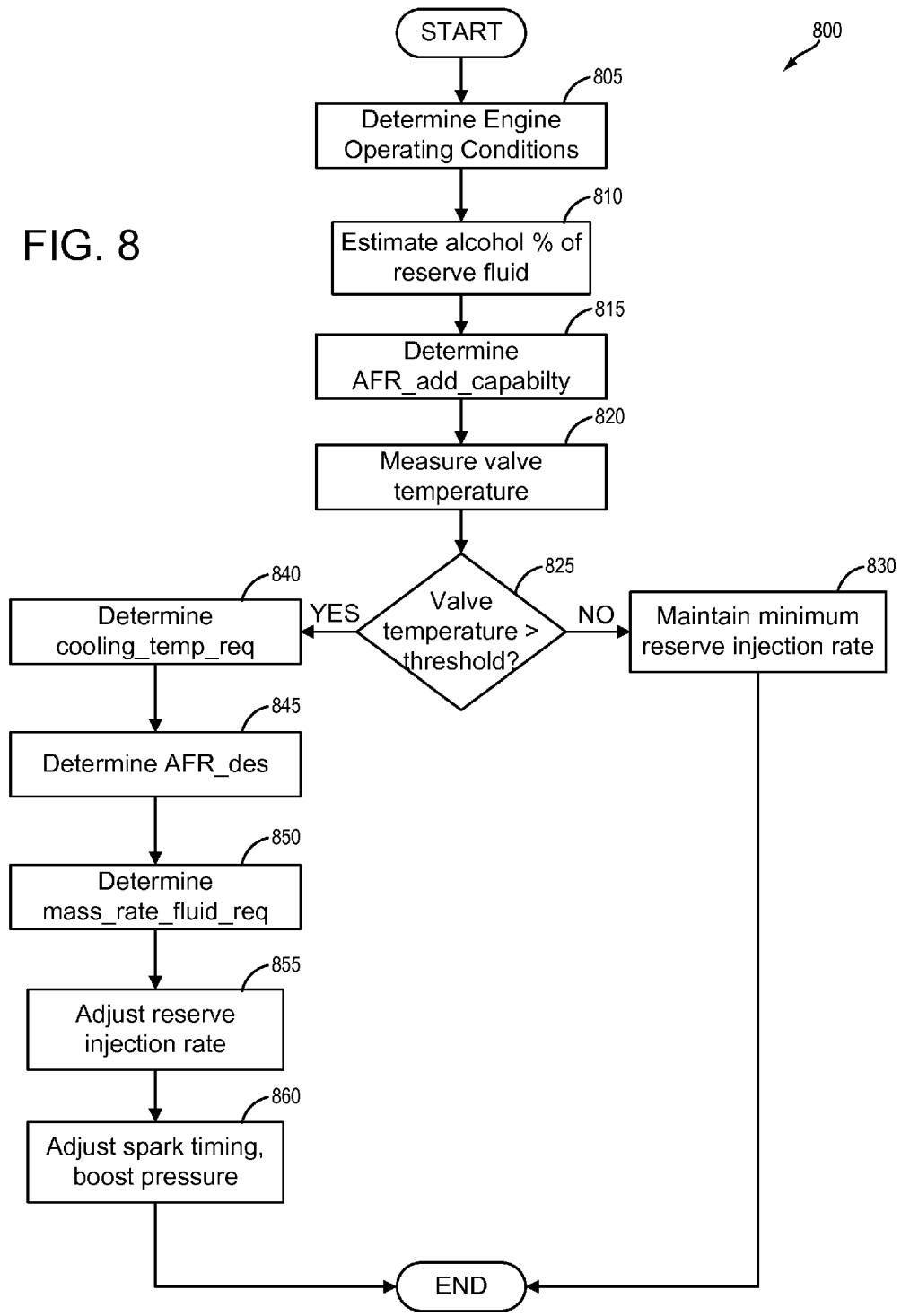
FIG. 8 depicts an example flow chart for adjusting the rate of a secondary injection.

FIG. 8 shows a flowchart depicting method 800 in accordance with the present disclosure. Method 800 may be carried out by controller 12. Method 800 may be implemented as a subroutine of another method, for example method 300. In particular, method 800 may be implemented in a gaseous fueled, bi-fueled or multi-fueled vehicle comprising a reservoir of a secondary injectant, for example, the system depicted in FIG. 2. Method 800 may be executed as part of a routine to mitigate engine knock, a routine to maximize specific power, or to otherwise control the ignition cycle of an engine. Method 800 will be described herein with reference to a vehicle comprising a turbocharged CNG engine and a reservoir that may hold a methanol or ethanol solution, but it is to be understood that the method could be implemented in other vehicles without departing from the scope of this disclosure.

Method 800 may begin at 805 by determining engine operating conditions. Engine operating conditions may be measured, estimated or inferred, and may include various vehicle conditions, such as vehicle speed, as well as various engine operating conditions, such as engine speed, engine temperature, exhaust temperature, boost level, MAP, MAF, torque demand, horsepower demand, etc.

At 810, method 800 may include measuring or estimating the amount of alcohol of a secondary injectant held in a reserve tank. For example, the alcohol percentage may be measured as a function of vapor pressure and fluid volume in the reserve tank, or may be estimated based on the qualities of a commercial product, such as a windshield wiper fluid.

At 815, method 800 may include determining a value for an AFR that is achievable with injection of the secondary injectant as a function of the alcohol percentage of the secondary injectant. This value may be referred to as AFR_add_capability. The secondary injectant may be used to allow richer AFR combustion than with CNG alone. The combustion profile and maximum AFR for CNG+injectant may be determined as a function of the alcohol percentage of the secondary injectant. For example, 100% methanol has a very wide AFR window, whereas 20% methanol has a narrower AFR window.

At 820, method 800 may include measuring valve temperature in a cylinder. This may include measuring the temperature of a valve or valve seat, or estimating the valve temperature based on engine conditions, such as exhaust temperature. Valve temperature may be measured or estimated for an intake valve, exhaust valve or both. Valve temperature may be measured or estimated for each valve of a multi-cylinder engine or may be measure or estimated for the engine as a whole.

At 825, method 800 may include determining whether the valve temperature measured or estimated at 820 is greater than a threshold. The threshold may be predetermined, or may be calculated as a function of current engine operating conditions. If the valve temperature is not above the threshold, method 800 may proceed to 830. At 830, method 800 may include maintaining a minimum reserve injection rate. The minimum reserve injection rate may be a function of a quality of the reserve fluid, for example, the alcohol percentage of the reserve fluid. The minimum reserve injection rate may be set to the minimum rate necessary to produce a minimum quantity of soot during a combustion cycle in order to act as an exhaust valve lubricant.

If the valve temperature is above the threshold, method 800 may proceed to 840. At 840, method 800 may include determining the cooling temperature required as a function of valve temperature. The cooling temperature required may be referred to herein as cooling_temp_req and may be a temperature required to maintain valve temperature at a certain value below the threshold temperature as a function of current engine operating conditions.

At 845, method 800 may include determining a desired AFR. The desired AFR may be referred to herein as AFR_des, and may be a function of AFR_add_capabilty, cooling_temp_req, and other engine operating conditions. The value of AFR_des may be set as an AFR necessary such that rich combustion is achieved and combustion temperature is lowered from current conditions.

At 850, method 800 may include determining a secondary injection rate needed to achieve AFR_des as a function of engine operating conditions. The secondary injection rate may be referred to herein as mass_rate_fluid_req and may be a function of the alcohol percentage of the reserve fluid, of AFR_add_capability, cooling_temp_req, engine speed, engine load, and other engine operating conditions.

At 855, method 800 may include adjusting the reserve injection rate, such that the injection rate is a function of mass_rate_fluid_req. The injection rate may be adjusted indefinitely, or commanded to adjust until valve temperature has decreased below a threshold value.

When the injection profile has been adjusted as a function of secondary injectant ignitability, method 800 may proceed to 860. At 860, method 800 may include adjusting spark timing and/or adjusting boost pressure.

The reserve injection profile, spark timing and boost pressure may be implemented with a lookup map where desired engine performance qualities are mapped to injection profiles and spark timing profiles and as a function of the quality and quantity of fuel and reserve injectant available. The reserve injection profile, spark timing and boost pressure may be determined sequentially and as a function of each other, or may be determined concurrently, for example, through a lookup map. For example, the secondary injection profile may be determined as a function of the boost pressure. The reserve injection profile, spark timing and boost pressure may be set iteratively through a feedback loop and may further be continuously updated as a function of vehicle speed, engine load, desired A/F ratio, engine knock or other engine operating conditions.

FIG. 9 shows a schematic diagram of a combustion cylinder 14 in accordance with the present disclosure. As described above, and with regard to FIGS. 1 and 2, cylinder 14 comprises chamber walls 136, cooling sleeve 118, intake valve 150, which is disposed between cylinder 14 and intake manifold 144, exhaust valve 156, which is disposed between cylinder 14 and exhaust manifold 148, piston 138, which may be coupled to crankshaft 140, and spark plug 192. In this example, cylinder 14 is shown coupled to direct fuel injector 166 and direct secondary injector 966. Cylinder 14 may also be coupled to port fuel injector 170 (not shown).

The combustion chamber of cylinder 14 may be striated into two zones, end zone 901 and interior zone 902. End zone 901 may include the regions of the combustion chamber most likely to become the end zone of combustion, and thus the regions of the combustion chamber most likely to undergo engine knock. Direct secondary injector 966 may be configured so as to inject a diluent into the regions of the combustion chamber most likely to become the end zone of combustion. In this way, the secondary injectant can be efficiently targeted to parts of the cylinder where knock is most likely to occur.

Direct secondary injector 966 may be configured to inject fluid as a function of piston position combustion cycle, for example, injecting at the end of combustion. Injector 966 may inject large droplets, as compared to the finely atomized droplets injected by direct injector 166. In this way, the injection streams exiting injector 966 may penetrate further into the end zone 901 of cylinder 14, where end zone 901 is positioned lower in the combustion chamber than zone 902. In some embodiments, injector 966 may be a radially targeted injector. Direct injector 166 may be configured to inject fuel into interior zone 902. Direct injecting a quantity of the liquid fuel may comprise injecting the liquid fuel at different timings responsive to a predicted location of an end zone of combustion. Additionally, injecting the liquid may comprise injecting liquid fuel with a radially targeted injector to different locations of the cylinder responsive to a predicted location of an end zone of combustion. In this way, a stratified fuel type charge may be established.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a turbocharged engine, comprising:
    after port injecting a first quantity of a first gaseous fuel into an intake port upstream of an engine cylinder during a cylinder cycle, direct injecting a second quantity of a second, liquid fuel into the engine cylinder at a first timing that is a function of a desired post-ignition air-fuel ratio including:
    determining whether engine knock is detected or anticipated;
    determining whether engine power and/or torque demand is greater than a threshold;
    responsive to the detection or anticipation of engine knock, and the engine power and/or torque demand not being greater than the threshold, direct injecting the second quantity of the second, liquid fuel after spark during a power stroke in the cylinder cycle;
    responsive to the engine knock not being detecting or anticipated, and the engine power and/or torque demand being greater than the threshold, direct injecting the second quantity of the second, liquid fuel before spark during a compression stroke in the cylinder cycle; and
    responsive to the detection or anticipation of engine knock, and the engine power and/or torque demand being greater than the threshold, direct injecting the second quantity of the second, liquid fuel after bottom dead center of an exhaust stroke of the cylinder cycle.

2. The method of claim 1, where the first gaseous fuel is either one or both of CNG and methane.

3. The method of claim 1, where the second, liquid fuel is either one or both of a methanol solution and an ethanol solution.

4. The method of claim 3, where the second, liquid fuel is a windshield wiper fluid stored within a windshield wiper fluid tank.

5. The method of claim 3, where the second quantity of the second, liquid fuel is a function of an amount of alcohol in the solution.

6. The method of claim 1, wherein the second quantity is less than the first quantity.

7. The method of claim 1, wherein the direct injection of the second quantity of the second, liquid fuel before spark during the compression stroke in the cylinder cycle lowers the air-fuel ratio from a substantially stoichiometric air-fuel ratio to a substantially rich air-fuel ratio.

8. The method of claim 1, wherein the direct injection of the second quantity of the second, liquid fuel after spark during the power stroke in the cylinder cycle lowers the air-fuel ratio from a substantially lean air-fuel ratio to a substantially stoichiometric air-fuel ratio.

9. The method of claim 1, wherein the direct injecting of the second quantity of the second, liquid fuel after bottom dead center of the exhaust stroke of the cylinder cycle decreases an engine temperature, and where the engine temperature includes an exhaust valve temperature.

10. The method of claim 1, where the direct injecting of the second quantity of the second, liquid fuel further comprises injecting the second, liquid fuel at different timings so as to penetrate an interior zone of the engine cylinder responsive to a predicted location of an end zone of combustion.

11. The method of claim 1, where injecting the second, liquid fuel further comprises injecting liquid fuel with a radially targeted injector to different locations of the engine cylinder responsive to a predicted location of an end zone of combustion, the radially targeted injector configured to inject larger droplets of liquid fuel than a primary direct injector configured to inject finely atomized droplets for combustion.

12. A method for operating a turbocharged engine, comprising:
during high load conditions, in response to an elevated engine temperature, after port injecting a first gaseous fuel into an intake port upstream of an engine cylinder:
in response to an ignitability of a second, liquid fuel being below a threshold, direct injecting the second, liquid fuel into the engine cylinder at a timing that is after spark-ignition of a cylinder cycle, but during combustion of the first gaseous fuel; and
in response to the ignitability of the second, liquid fuel being above the threshold, direct injecting the second, liquid fuel into the engine cylinder at a timing that is before spark-ignition of the cylinder cycle.

13. The method of claim 12, where the first gaseous fuel is either one or both of CNG or methane.

14. The method of claim 13, where the timing that is after spark-ignition of the cylinder cycle but during combustion of the first gaseous fuel is delayed proportionally to a decrease in the ignitability of the second, liquid fuel, and the timing is after flame kernel formation.

15. The method of claim 12, wherein the timing that is after spark-ignition of the cylinder cycle but during combustion of the first gaseous fuel is during a power stroke after a 10% burn time.

16. The method of claim 12, wherein the timing that is after spark-ignition of the cylinder cycle, but during combustion of the first gaseous fuel is adjusted as a function of a boost level.

17. A method for operating a turbocharged engine, comprising:
after port injecting a first gaseous fuel into an intake port upstream of an engine cylinder during a cylinder cycle:
determining whether engine knock is detected or anticipated;
determining whether engine power and/or torque demand is greater than a threshold;
responsive to the detection or anticipation of engine knock, and the engine power and/or torque demand not being greater than the threshold, direct injecting a second, liquid fuel into the engine cylinder after spark during a power stroke in the cylinder cycle while maintaining spark timing without retarding or advancing spark timing relative to a previous combustion cycle of the engine cylinder;
responsive to the engine knock not being detecting or anticipated, and the engine power and/or torque demand being greater than the threshold, direct injecting the second, liquid fuel before spark, in the cylinder cycle, while maintaining spark timing without retarding or advancing spark timing relative to a previous combustion cycle of the engine cylinder; and
responsive to the detection or anticipation of engine knock, and the engine power and/or torque demand being greater than the threshold, direct injecting the second, liquid fuel after bottom dead center of an exhaust stroke of the cylinder cycle, while maintaining spark timing without retarding or advancing spark timing relative to a previous combustion cycle of the engine cylinder.

18. The method of claim 17, where the direct injecting of the second, liquid fuel further comprises increasing a density of a gas charge entering a combustion chamber.

19. The method of claim 18, wherein the direct injecting of the second, liquid fuel after bottom dead center of the exhaust stroke of the cylinder cycle decreases a temperature of exhaust gas exiting a combustion chamber.

* * * * *